(12) United States Patent
Du et al.

(10) Patent No.: US 9,669,766 B2
(45) Date of Patent: Jun. 6, 2017

(54) VEHICLE AND VEHICLE STEP APPARATUS

(71) Applicant: T-MAX (HANGZHOU) INDUSTRIAL CO., LTD, Hangzhou (CN)

(72) Inventors: Xinfa Du, Hangzhou (CN); Xing Fan, Hangzhou (CN); Qi Zhang, Hangzhou (CN)

(73) Assignee: T-MAX (HANGZHOU) INDUSTRIAL CO., LTD, Hangzhou (CN)

( * ) Notice: Subject to any disclaimer, the term of this patent is extended or adjusted under 35 U.S.C. 154(b) by 0 days.

(21) Appl. No.: 14/875,106

(22) Filed: Oct. 5, 2015

(65) Prior Publication Data

US 2016/0347253 A1 Dec. 1, 2016

(30) Foreign Application Priority Data

Jun. 1, 2015 (CN) .......................... 2015 1 0293399
Jun. 1, 2015 (CN) ...................... 2015 2 0367459 U

(51) Int. Cl.
*B60R 3/00* (2006.01)
*B60R 3/02* (2006.01)

(52) U.S. Cl.
CPC .............. *B60R 3/02* (2013.01); *B60R 3/002* (2013.01)

(58) Field of Classification Search
CPC .............. B60R 3/02; B60R 3/002; B60R 3/00
See application file for complete search history.

(56) References Cited

U.S. PATENT DOCUMENTS 5,085,450 A * 2/1992 DeHart, Sr. ............... B60R 3/02
280/166
6,325,397 B1 * 12/2001 Pascoe ...................... B60R 3/02
280/163

(Continued)

FOREIGN PATENT DOCUMENTS

CN        104309536 A     1/2015
CN        204136878 U     2/2015

(Continued)

OTHER PUBLICATIONS

International Search Report for PCT International Application No. PCT/CN2015/097928 mailed Mar. 24, 2016.

*Primary Examiner* — Hau Phan
(74) *Attorney, Agent, or Firm* — Howard & Howard Attorneys PLLC

(57) ABSTRACT

A vehicle includes a vehicle body; a door moveable between an opened position and a closed position, a step moveable between an extending position and a retracting position, a driving device for moving the step between the extending position and the retracting position, a magnetic member, an emitter, a receiver and a controller. The magnetic member is mounted on one of the vehicle body and the door, and the magnetic induction member is magnetically coupled with the magnetic member so as to generate a signals. The emitter is coupled with the magnetic induction member and configured to emit the signals and the receiver receives the signals from the emitter. The controller is coupled with the driving device and the receiver so as to drive the step to move between the extending position and the retracting position based on the signals.

1 Claim, 5 Drawing Sheets

(56) References Cited

U.S. PATENT DOCUMENTS

| | | | |
|---|---|---|---|
| 6,988,026 B2 * | 1/2006 | Breed | G07C 5/0808 701/31.4 |
| 7,513,565 B2 * | 4/2009 | Watson | B60R 3/02 280/163 |
| 8,602,431 B1 | 12/2013 | May | |
| 8,833,782 B2 * | 9/2014 | Huotari | B60R 3/02 280/163 |
| 8,882,033 B2 * | 11/2014 | Rittner | A62B 7/14 128/202.26 |
| 9,205,781 B1 | 12/2015 | May | |
| 9,308,870 B2 * | 4/2016 | Yang | B60R 3/02 |
| 2005/0173886 A1 | 8/2005 | Leitner | |
| 2007/0159308 A1 * | 7/2007 | Johnston | B60P 3/36 340/425.5 |
| 2008/0025829 A1 * | 1/2008 | Denison | A61G 3/061 414/537 |
| 2010/0044993 A1 * | 2/2010 | Watson | B60R 3/02 280/166 |
| 2011/0233889 A1 * | 9/2011 | Watson | B60R 3/02 280/166 |
| 2012/0098231 A1 * | 4/2012 | Huotari | B60R 3/02 280/166 |
| 2012/0139206 A1 | 6/2012 | May | |
| 2014/0121859 A1 * | 5/2014 | Cha | B60R 3/02 701/2 |
| 2014/0125031 A1 * | 5/2014 | Oh | B60R 3/02 280/166 |
| 2014/0333042 A1 * | 11/2014 | Cha | B60R 3/02 280/166 |
| 2015/0274079 A1 * | 10/2015 | Yang | B60R 3/02 280/166 |
| 2016/0031376 A1 * | 2/2016 | Stickles | B60R 3/02 280/166 |

FOREIGN PATENT DOCUMENTS

| | | |
|---|---|---|
| CN | 204323201 U | 5/2015 |
| CN | 104859724 A | 8/2015 |
| CN | 204641564 U | 9/2015 |
| CN | 204713220 U | 10/2015 |
| KR | 1020060102645 A | 9/2006 |

* cited by examiner

VEHICLE AND VEHICLE STEP APPARATUS

CROSS-REFERENCE TO RELATED APPLICATIONS

The present application claims priority to and all the benefits of Chinese Patent Application No. 201510293399.1 filed on Jun. 1, 2015 and Chinese Patent Application No. 201520367459.5 filed on Jun. 1, 2015, both of which are hereby expressly incorporated herein by reference in their entirety.

BACKGROUND OF THE INVENTION

1. Field of the Invention

Embodiments of the present invention generally relate to the field of vehicle, and more particularly, to a vehicle and a vehicle step apparatus.

2. Description of the Related Art

A vehicle step apparatus mounted on a chassis of a vehicle is used to assist passengers to get on or off the vehicle. In the related art, a control circuit of the vehicle step apparatus is integrated in a control system of the vehicle, that is, a control signal of the control circuit accesses a CAN (Controller Area Network) bus of the vehicle.

SUMMARY OF THE INVENTION

The present invention is proposed based on the following problems and facts realized by the inventors.

In the related art, a control circuit of a vehicle step apparatus is integrated into a CAN bus of a vehicle. However, considering the technical confidentiality, many vehicle manufacturers may set protection measures for a communication system of the vehicle and prohibit an access of foreign signals. In this case, the control signal of the control circuit of the vehicle step apparatus cannot access the bus of the vehicle, so that it is difficult to integrate the control circuit of the vehicle step apparatus into the bus of the vehicle. In addition, in order to integrate the control circuit of the vehicle step apparatus into the bus of the vehicle, it is required to modify the bus of the vehicle, thus increasing the cost and the complexity of the operation, and reducing the reliability of the vehicle.

Embodiments of the present invention seek to solve at least one of the problems existing in the related art to at least some extent. Accordingly, Embodiments of the present invention provide a vehicle including a vehicle step apparatus, and the vehicle step apparatus can be controlled independently.

Embodiments of the present invention further provide a vehicle step apparatus of a vehicle.

Accordingly, embodiments of the present invention provide a vehicle including: a vehicle body; a door mounted on the vehicle body and moveable between an opened position and a closed position; a step mounted on the vehicle body and moveable between an extending position and a retracting position; a driving device coupled with the step so as to move the step between the extending position and the retracting position; a magnetic member mounted on one of the vehicle body and the door; a magnetic induction member mounted on the other of the vehicle body and the door and magnetically coupled with the magnetic member so as to generate a first signal of opening the door and a second signal of closing the door; an emitter coupled with the magnetic induction member and configured to emit the first signal of opening the door and the second signal of closing the door; a receiver configured to receive the first signal of opening the door and the second signal of closing the door from the emitter; and a controller coupled with the driving device and the receiver and configured to control the driving device to move the step between the extending position and the retracting position based on the first signal of opening the door and the second signal of closing the door.

With the vehicle according to embodiments of the present invention, it may be easy to get on and get off for a passenger, and the step thereof may be controlled independently.

Embodiments of the present invention provide a vehicle step apparatus of vehicle, including: a step moveable between an extending position and a retracting position; a driving device coupled with the step so as to move the step between the extending position and the retracting position; a magnetic member; a magnetic induction member magnetically coupled with the magnetic member and configured to generate a first signal of opening the door and a second signal of closing the door; an emitter coupled with the magnetic induction member and configured to emit the first signal of opening the door and the second signal of closing the door; a receiver configured to receive the first signal of opening the door and the second signal of closing the door from the emitter; and a controller coupled with the driving device and the receiver and configured to control the driving device to move the step between the extending position and the retracting position based on the first signal of opening the door and the second signal of closing the door.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 1:
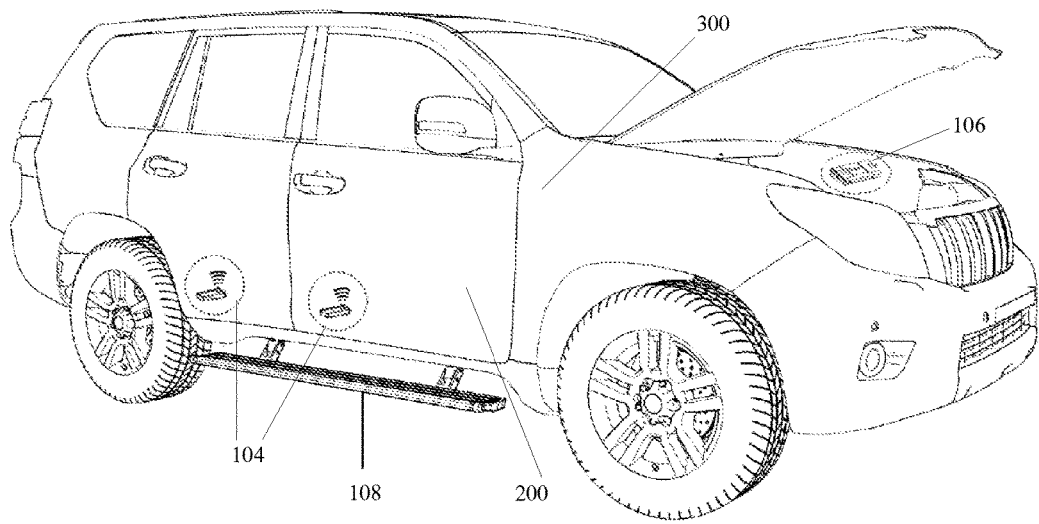
FIG. 1 is a schematic view of a vehicle according to an embodiment of the present invention.

Reference will be made in detail to embodiments of the present invention. Embodiments of the present invention will be shown in drawings, in which the same or similar members and the members having same or similar functions are denoted by like reference numerals throughout the descriptions. The embodiments described herein according to drawings are explanatory and illustrative, not construed to limit the present invention.

The following description provides a plurality of embodiments or examples configured to achieve different structures of the present invention. In order to simplify the publication of the present invention, components and dispositions of the particular embodiment are described in the following, which are only explanatory and not construed to limit the present invention. In addition, the present invention may repeat the reference number and/or letter in different embodiments for the purpose of simplicity and clarity, and the repeat does not indicate the relationship of the plurality of embodiments and/or dispositions. Moreover, in description of the embodiments, the structure of the second characteristic "above" the first characteristic may include an embodiment formed by the first and second characteristic contacted directly, and also may include another embodiment formed between the first and the second characteristic, in which the first characteristic and the second characteristic may not contact directly.

In the description of the present invention, unless specified or limited otherwise, it should be noted that, terms "mounted," "coupled" and "coupled" may be understood broadly, such as electronic connection or mechanical connection, inner communication between two members, direct connection or indirect connection via intermediary. These having ordinary skills in the art should understand the specific meanings in the present invention according to specific situations.

A vehicle 1000 according to embodiments of the present invention will be described with reference to the drawings.

As shown in FIG. 1 to FIG. 8, the vehicle 1000 according to embodiments of the present invention includes a vehicle step apparatus 100, a door 200 and a vehicle body 300. The door 200 is mounted on the vehicle body 300 and moveable between an opened position and a closed position. The vehicle step apparatus 100 includes a step 108, a driving device 110, a magnetic member 109 such as a magnet, a magnetic induction member 103, an emitter 104, a receiver 105 and a controller 106.

The step 108 is mounted on the vehicle body 300 via the driving device 110 and moveable between an extending position and a retracting position under the driving of the driving device 110. In other words, the step 108 is mounted on the driving device 110 such that the driving device 110 drives the step 108 to move between the extending position and the retracting position.

The magnetic member 109 is mounted on one of the vehicle body 300 and the door 200. The magnetic induction member 103 is mounted on the other of the vehicle body 300 and the door 200. The magnetic induction member 103 is magnetically coupled with the magnetic member 109, such that the magnetic induction member 103 will generate a first signal (i.e. door-opening signal) when the door 200 is opening and will generate a second signal (i.e. door-closing signal) when the door 200 is closing.

The emitter 104 is coupled with the magnetic induction member 103 and is used to emit the first signal of opening the door 200 and the second signal of closing the door 200. The receiver 105 is used to receive the first signal of opening the door 200 and the second signal of closing the door 200 from the emitter 104.

The controller 106 is coupled with the driving device 110 and the receiver 105 and controls the driving device 110 to move the step 108 between the extending position and the retracting position based on the first signal of opening the door 200 and the second signal of closing the door 200. In other words, when the receiver 105 receives the first signal, the controller 106 will control the driving device 110 to move the step 108 from the retracting position to the extending position. When the receiver 105 receives the second signal, the controller 106 will control the driving device 110 to move the step 108 from the extending position to the retracting position.

An operation of the vehicle step apparatus 100 will be described with reference to FIG. 1 to FIG. 8. When a user opens the door 200, the magnetic member 109 moves away from the magnetic induction member 103, the magnetic induction member 103 induces the magnetic field of the magnetic member 103 moving away therefrom and generates a first signal of opening the door 200. Then the emitter 104 emits the first signal of opening the door 200, and the receiver 105 receives the first signal of opening the door 200.

When the receiver 105 receives the first signal, the controller 106 controls the driving device 110 to operate and to move the step 108 from the retracting position to the extending position, such that the user can get on the vehicle or get off the vehicle by stepping the step 108.

When the user closes the door 200, the magnetic member 109 approaches the magnetic induction member 103, the magnetic induction member 103 induces the magnetic field of the approaching magnetic member 109 and generates a second signal of closing the door 200. Then the emitter 104 emits the second signal of closing the door 200, and the receiver 105 receives the second signal of closing the door 200.

When the receiver 105 receives the second signal of closing the door 200, the controller 106 controls the driving device 110 to operate and to move the step 108 from the extending position to the retracting position.

The vehicle 1000 according to embodiments of the present invention controls the step 108 to extend and retract based on the first and second signals which are generated by the magnetic induction member 103, thereby the step 108 can extend and retract automatically. Thus the user can get on the vehicle 1000 and get off the vehicle 1000 conveniently.

Moreover, the vehicle step apparatus 100 of the vehicle 1000 controls the driving device 110 by the controller 106 independent of the vehicle' own control system, it will not increase the burden of the control system of the vehicle. Specifically, the vehicle step apparatus 100 is not necessary to be integrated into the control system of vehicle 1000 by using the CAN bus of vehicle 1000, and the vehicle step apparatus 100 is controlled by the controller 106 independent of the control system of the vehicle, therefore the burden of the control system of the vehicle 1000 will not be increased. In addition, the vehicle step apparatus 100 is easy to control and mount. Further, it is easy for the user to get on and get off the vehicle by the vehicle step apparatus 100.

As shown in FIG. 1 to FIG. 8, in some embodiments, the vehicle 1000 includes the vehicle body 300, the door 200, the step 108, the driving device 110, the magnetic member 109, the magnetic induction member 103, the emitter 104, the receiver 105 and the controller 106.

Figure 6:
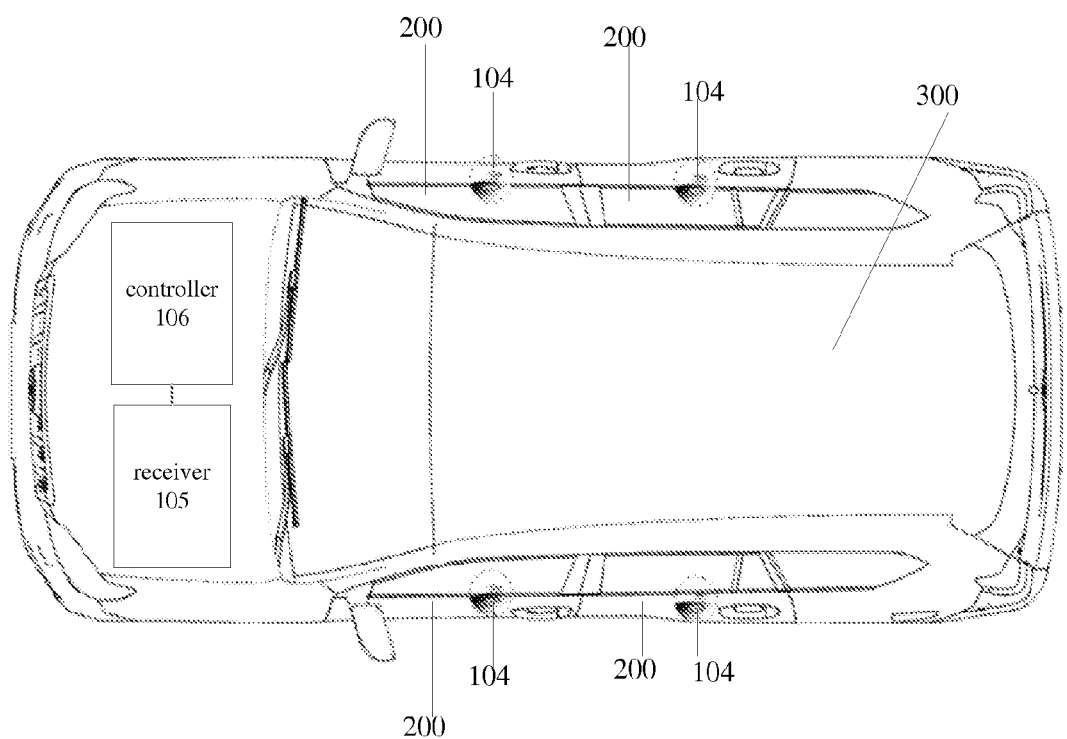
FIG. 6 is a schematic view of a vehicle according to an embodiment of the present invention.
Figure 8:
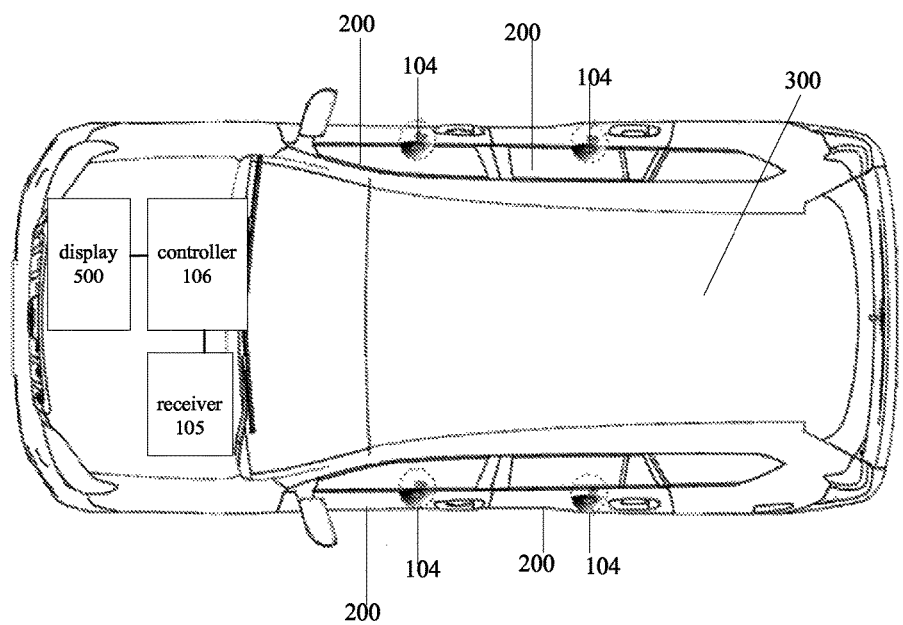
FIG. 8 is a schematic view of a vehicle according to an embodiment of the present invention.

As shown in FIG. 6 and FIG. 8, the door 200 includes a first front door 201, a first back door 202, a second front door 203 and a second back door 204. The first front door 201 and the first back door 202 are mounted on a first side (i.e. left side) of the vehicle body 300, the second front door 203 and the second back door 204 are mounted on a second side (i.e. right side) of the vehicle body 300.

Figure 7:
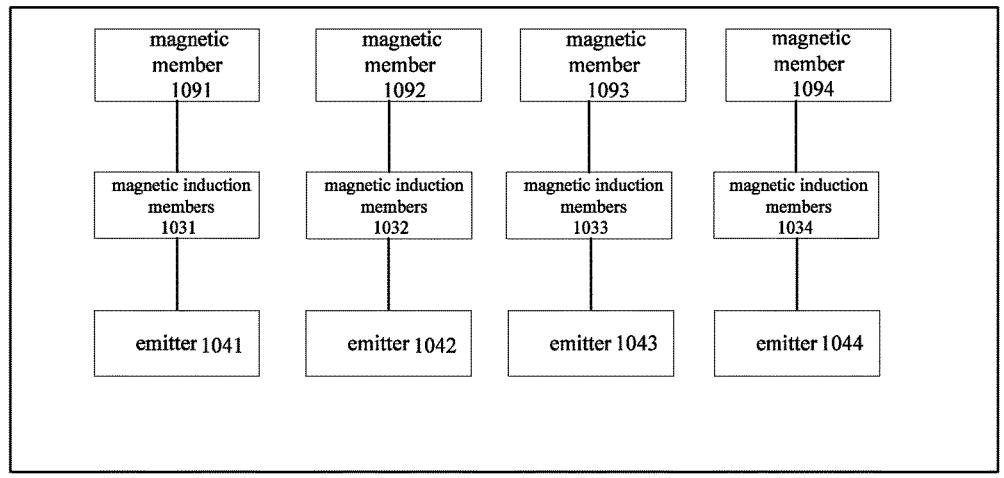
FIG. 7 is a local block diagram of a vehicle step apparatus of the vehicle according to an embodiment of the present invention.

As shown in FIG. 7, the magnetic member 109 includes first to four magnetic members 1091, 1092, 1093, 1094 such as magnets, and the magnetic induction member 103 includes first to four magnetic induction members 1031, 1032, 1033, 1034 corresponding to the first to fourth magnetic members 1091, 1092, 1093, 1094 respectively.

As shown in FIG. 7, the emitter 104 is coupled with each of the first to four magnetic induction members 1031, 1032, 1033, 1034, such that the step 108 will be extended or extracted when anyone of the first front door 201, the first back door 202, the second front door 203 and the second back door 204 is opening or closing.

The first magnetic member 1091 is mounted on the first front door 201, the second magnetic member 1092 is mounted on the first back door 202, the third magnetic member 1093 is mounted on the second front door 203, and the fourth magnetic member 1094 is mounted on the second back door 204.

The first magnetic induction member 1031 coupled with the first magnetic member 1091 is mounted on a first part of the vehicle body 300 in front of the first front door 201. The second magnetic induction member 1032 coupled with the second magnetic member 1092 is mounted on a second part of the vehicle body 300 behind the first back door 202. The third magnetic induction member 1033 coupled with the third magnetic member 1093 is mounted on a third part of the vehicle body 300 in front of the second front door 203. The fourth magnetic induction member 1034 coupled with the fourth magnetic member 1094 is mounted on a fourth part of the vehicle body 300 behind the second back door 204.

Advantageously, the emitter 104 includes first to four emitters 1041, 1042, 1043 and 1044, the first to four emitters 1041, 1042, 1043 and 1044 are coupled with the first to four magnetic induction members 1031, 1032, 1033, 1034 respectively. Thus, the first signal or the second signal generated by one magnetic induction member will be sent to the receiver 105 by one emitter corresponding to the one magnetic induction member, thus realizing the transmitting of the signal from multiple points to one point. Consequently, the controller 106 will control the drive device 110 based on the first signal or the second signal to drive the corresponding step 108 to extend or retract.

In other words, there are two steps 108 which are disposed at two sides of the vehicle body 300 respectively. Accordingly, there are two driving devices 110 which are used to move the two steps 108 respectively. In other words, one step 108 and one driving device 110 coupled with the one step 108 are mounted on the left side of the vehicle body 300. Another step 108 and another driving device 110 coupled with this another step 108 are mounted on the right side of the vehicle body 300.

Figure 4:
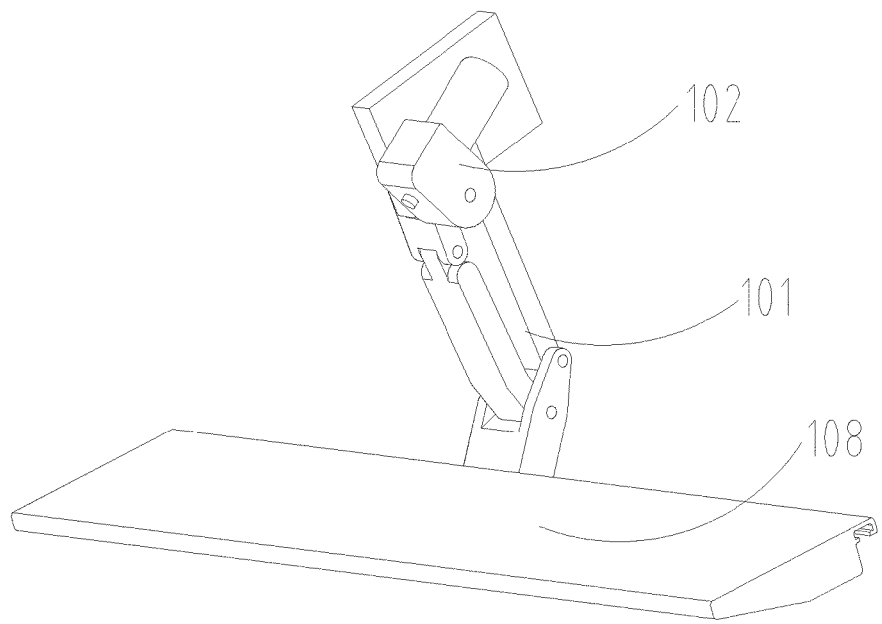
FIG. 4 is a schematic view showing a step in an extending position according to an embodiment of the present invention.
Figure 5:
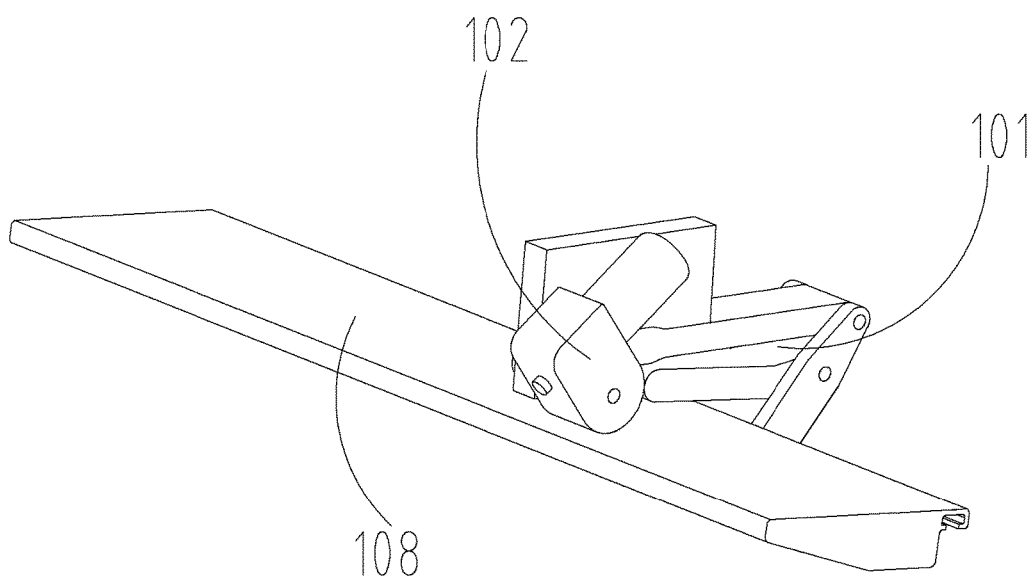
FIG. 5 is a schematic view showing a step in a retracting position according to an embodiment of the present invention.

As shown in FIG. 4 and FIG. 5, in some embodiments, the driving device 110 includes an extending and retracting device 101 and a motor 102. The extending and retracting device 101 is mounted on the vehicle body 300, and the controller 106 is coupled with the motor 102. The motor 102 is coupled with the extending and retracting device 101 so as to drive the extending and retracting device 101 to extend and extract, and the step 108 is mounted on the extending and retracting device 101 such that the step 108 is driven by the extending and retracting device 101 to move between the extending position and the retracting position.

Specifically, when the user opens the door 200, the controller 106 controls the motor 102 to rotate forwardly, thereby the motor 102 drives the extending and retracting device 101 to extend, such that the extending and retracting device 101 moves the step 108 from the retracting position to the extending position, as shown in FIG. 4. When the user closes the door 200, the controller 106 controls the motor 102 to rotate backwardly, thereby the motor 102 drives the extending and retracting device 101 to retract, such that the extending and retracting device 101 moves the step 108 from the extending position to the retracting position, as shown in FIG. 5.

Figure 2:
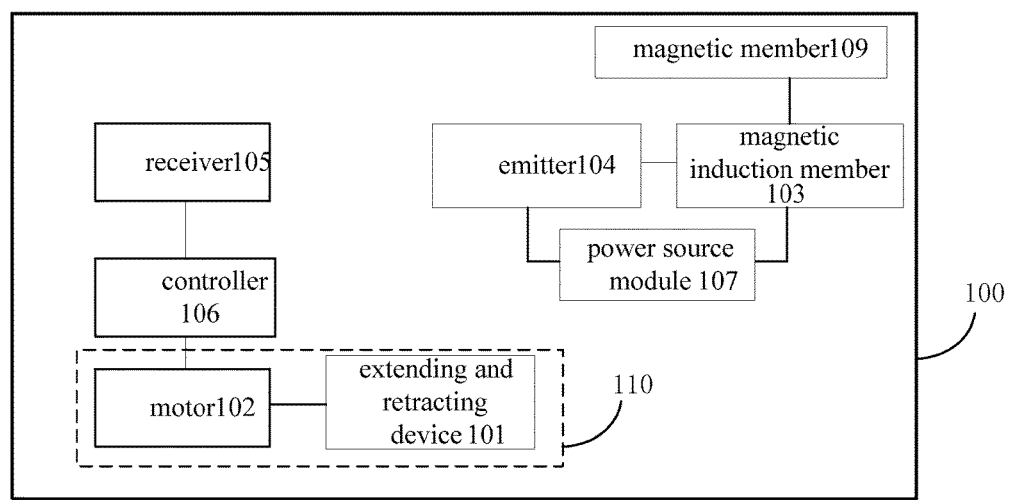
FIG. 2 is a block diagram of a vehicle step apparatus of the vehicle according to an embodiment of the present invention.

FIG. 2 is a block diagram of a vehicle step apparatus 100 of the vehicle 1000 according to embodiments of the present invention. As shown in FIG. 2, the vehicle step apparatus 100 includes the extending and retracting device 101, the motor 102, the magnetic member 109, the magnetic induction member 103, the emitter 104, the receiver 105 and the controller 106. Specifically, the magnetic induction member 103 is configured as a reed switch.

The extending and retracting device 101 is mounted on the vehicle body 300, and the motor 102 is used to drive the extending and retracting device 101 to extend and retract. The magnetic member 109 is coupled with the magnetic induction member 103 so as to detect an opening state and a closing state of the door 200 and generate the first signal indicating that the door 200 is opening and the second signal indicating that the door 200 is closing.

The emitter 104 is coupled with the magnetic induction member 103, and used to emit the first signal and the second signal. Advantageously, the emitter 104 is mounted on the vehicle body 300 and closed to the door 200.

The receiver 105 is used to receive the first signal and the second signal from the emitter 104. Advantageously, the receiver 105 receives the first signal and the second signal from the emitter 104 via a wireless communication.

The controller 106 is coupled with the motor 102 and the receiver 105 and controls the motor 102 to drive the extending and retracting device 101 to extend and retract based on the first signal and the second signal, thereby the extending and retracting device 101 moves the step 108 between the extending position and the retracting position.

Figure 3:
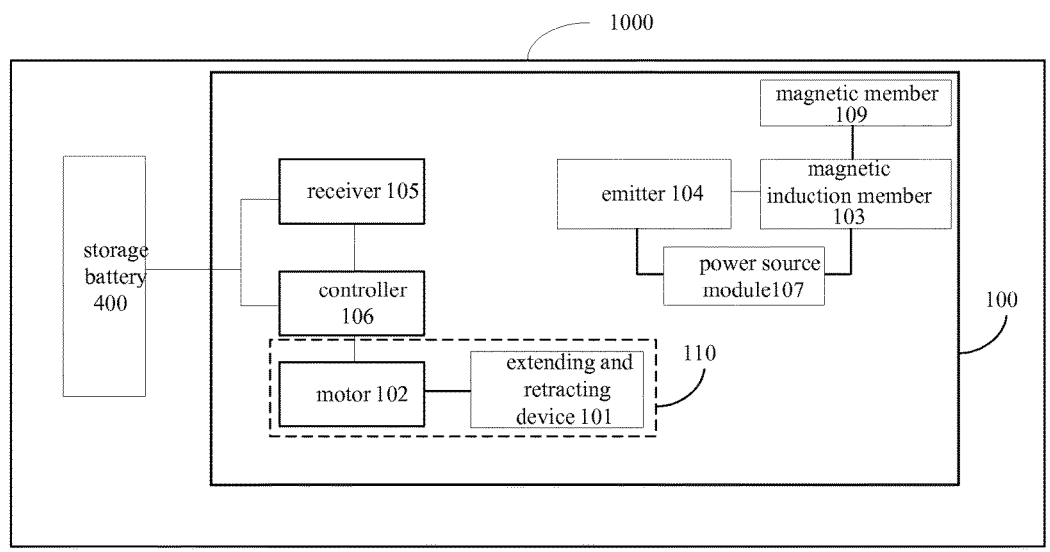
FIG. 3 is a block diagram of a vehicle according to an embodiment of the present invention.

As shown in FIG. 2 and FIG. 3, in some embodiments, the vehicle step apparatus 100 further includes a power source module 107. The power source module 107 is coupled with the magnetic induction member 103 and the emitter 104 and sued to supply power to the magnetic induction member 103 and the emitter 104.

As shown in FIG. 3, in some embodiments, the vehicle 1000 further includes a vehicle-mounted storage battery 400. The vehicle-mounted storage battery 400 is coupled with the receiver 105 and the controller 106 and used to supply power to the receiver 105 and the controller 106.

An operation of the vehicle step apparatus 100 will be described below. Table 1 is a truth table of a wireless communication between the emitter 104 and the receiver 105.

When the magnetic induction member 103 senses that the door 200 is opened, the magnetic induction member 103 generates the first signal X1 and sends the first signal X1 to the receiver 105. The receiver 105 receives the first signal X1 and output a high level V+ to the controller 106 correspondingly. Then the controller 106 controls the motor 102 to rotate so as to drive the extending and retracting device 101 to extend based on the high level V+(level signal). The extending and retracting device 101 moves the step 108 from the retracting position to the extending position, such that the user can get on the vehicle 1000 conveniently.

When the magnetic induction member 103 senses that the door 200 is closed, the magnetic induction member 103 generates the second signal X2 and sends the second signal X2 to the receiver 105. The receiver 105 receives the second signal X2 and output a low level V− to the controller 106 correspondingly. Then the controller 106 controls the motor 102 to rotate so as to drive the extending and retracting device 101 to retract based on the low level V− (level signal). The extending and retracting device 101 moves the step 108 from the extending position to the retracting position.

Table 2 illustrates a corresponding relationship between input signals and output signals of the emitter 104. For example, when the door 200 is opened, a signal X indicating the state of the door 200 which corresponds to an input signal of the emitter 104 equals to the first signal X1. The emitter 104 converts the first signal X1 into a wireless signal Y1 which corresponds to a signal indicating the door 200 is opening and transmits the wireless signal Y1 via wireless communication such as WIFI. The receiver 105 receives the wireless signal Y1 and sends the wireless signal Y1 to the controller 106.

Table 3 illustrates a corresponding relationship between input signals and output signals of the receiver 105. Specifically, the receiver 105 receives the wireless signal Y1 which is sent from the emitter 104 and corresponds to the signal of opening the door 200. The receiver 105 converts the wireless signal Y1 into an output signal and sends the output signal to the controller 106. The output signal is a switch quantity signal of opening the door 200, such as a high level V+. The controller 106 controls the motor 102 to rotate forwardly to drive the extending and retracting device 101 to extend, thereby the extending and retracting device 101 moves the step 108 to extend, as shown in FIG. 1.

In addition, when the magnetic induction member 103 senses that the door 200 is in a closing state, the magnetic induction member 103 sends the second signal X2 to the receiver 105. As shown in Table 2, the signal X of state of the door 200 which corresponds to an input signal of the emitter 104 equals to the second signal X2. The emitter 104 converts the second signal X2 into a wireless signal Y2 which corresponds to a signal of closing the door 200 and transmits the wireless signal Y2 via wireless communication such as WIFI. The receiver 105 receives the wireless signal Y2 and sends the wireless signal Y2 to the controller 106.

As shown in Table 3, the receiver 105 receives the wireless signal Y2 sent from the emitter 104 and corresponds to the signal of closing the door 200. The receiver 105 converts the wireless signal Y2 into an output signal and sends the output signal to the controller 106. The output signal is of closing the door 200, such as a low level V−. Then, the controller 106 controls the motor 102 to rotate backwardly to drive the extending and retracting device 101 to retract, thereby the extending and retracting device 101 retract the step 108.

TABLE 1

| Input (X) | Output (V) |
| --- | --- |
| first signal of opening the door 200 (X1) | High level (V+) |
| second signal of closing the door 200 (X2) | Low level (V−) |

TABLE 2

| | Name of signal | Signal state | | remark |
| --- | --- | --- | --- | --- |
| Input signal | Signal of state of the door 200 (X) | first signal of opening the door 200 (X1) | second signal of closing the door 200 | |

TABLE 2-continued

| | Name of signal | Signal state | | remark |
| --- | --- | --- | --- | --- |
| Output signal | Wireless signal (Y) | Wireless signal indicating opening state of door (Y1) | Wireless signal indicating closing state of door (Y2) | wireless signal |

TABLE 3

| | Name of signal | Signal state | | remark |
| --- | --- | --- | --- | --- |
| Input signal | Wireless signal (Y) | Wireless signal indicating opening state of door (Y1) | Wireless signal indicating closing state of door (Y2) | wireless signal |
| Output signal | switch quantity signal (V) | high level (V+) | low level (V−) | High (low) level |

As shown in FIG. 6, in some embodiments, the receiver 105 and the controller 106 may be disposed in an engine compartment of the vehicle 1000. The receiver 105 and the controller 106 are integral with each other.

As shown in FIG. 8, in some embodiments, the vehicle 1000 further includes a display 500. The display 500 is coupled with the controller 106. The display 500 is used to display an opening state and a closing state of the door 200, and an extending state and a retracting state of the step 108 under a control of the controller 106. Thus, the user can observe the extending state and the retracting state of the step 108 intuitively.

Each function unit of the vehicle step apparatus 100 may be integrated in one processing module, or each functional unit exists as an independent unit, or two or more units are integrated in one processing module. The integrated module can be embodied in hardware, or software. If the integrated module is embodied in software and sold or used as an independent product, it can be stored in the computer readable storage medium.

Reference throughout this specification to "an embodiment," "some embodiments," "an example," "a specific example," or "some examples," means that a particular feature, structure, material, or characteristic described in connection with the embodiment or example is included in at least one embodiment or example of the present invention. The appearances of the phrases throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it will be appreciated by those skilled in the art that the above embodiments cannot be construed to limit the present invention, and changes, alternatives, and modifications can be made in the embodiments without departing from spirit, principles and scope of the present invention. The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A vehicle comprising:
   a vehicle body;
   a door mounted on the vehicle body and moveable between an opened position and a closed position;
   a magnetic member mounted on one of the vehicle body and the door;
   a magnetic induction member mounted on the other of the vehicle body and the door and magnetically coupled with the magnetic member so as to generate a first signal of opening the door and a second signal of closing the door;
   wherein the door comprises a first front door and a first back door which are mounted on a first side of the vehicle body, and a second front door and a second back door which are mounted on a second side of the vehicle body,
   wherein the magnetic member comprises first to four magnetic members, and the magnetic induction member comprises first to four magnetic induction members corresponding to the first to fourth magnetic members respectively,
   wherein the first magnetic member is mounted on the first front door, the second magnetic member is mounted on the first back door, the third magnetic member is mounted on the second front door, the fourth magnetic member is mounted on the second back door,
   wherein the first magnetic induction member is mounted on a first part of the vehicle body in front of the first front door, the second magnetic induction member is mounted on a second part of the vehicle body behind the first back door, the third magnetic induction member is mounted on a third part of the vehicle body in front of the second front door, the fourth magnetic induction member is mounted on a fourth part of the vehicle body behind the second back door.

* * * * *